United States Patent
Takayanagi et al.

(10) Patent No.: US 10,001,800 B1
(45) Date of Patent: Jun. 19, 2018

(54) SYSTEMS AND METHODS FOR DETERMINING TEMPERATURES OF INTEGRATED CIRCUITS

(71) Applicant: Apple Inc., Cupertino, CA (US)

(72) Inventors: Toshinari Takayanagi, San Jose, CA (US); Yizhang Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 14/850,495

(22) Filed: Sep. 10, 2015

(51) Int. Cl.
  G06F 1/32 (2006.01)
  H01L 35/00 (2006.01)
  G05D 23/00 (2006.01)
  G05F 3/02 (2006.01)

(52) U.S. Cl.
  CPC .............. G05F 3/02 (2013.01); G06F 1/3296 (2013.01)

(58) Field of Classification Search
  CPC ..................................................... G06F 1/3203
  USPC ....................................................... 713/320
  See application file for complete search history.

(56) References Cited

U.S. PATENT DOCUMENTS

| | | | |
|---|---|---|---|
| 6,319,737 B1 | 11/2001 | Putnam et al. | |
| 6,535,013 B2 | 3/2003 | Samaan | |
| 6,789,037 B2 | 9/2004 | Gunther et al. | |
| 6,996,491 B2 | 2/2006 | Gold et al. | |
| 7,149,645 B2 | 12/2006 | Mangrulkar et al. | |
| 7,321,254 B2 | 1/2008 | Li et al. | |
| 7,413,353 B2* | 8/2008 | Beer | G02B 6/4232 264/1.24 |
| 7,590,473 B2* | 9/2009 | Wyatt | G11C 5/00 365/212 |
| 7,777,554 B2 | 8/2010 | Hirano | |
| 7,852,138 B2 | 12/2010 | Kuusilinna et al. | |
| 7,962,887 B2 | 6/2011 | Anderson et al. | |
| 8,130,024 B2 | 3/2012 | Zimlich | |
| 8,766,704 B2* | 7/2014 | Takayanagi | G06F 1/206 327/513 |
| 8,970,234 B2* | 3/2015 | Takayanagi | G01K 3/005 324/750.03 |
| 8,971,123 B2 | 3/2015 | Marko et al. | |
| 9,500,538 B2* | 11/2016 | Maleki | H01M 10/486 |
| 2003/0110423 A1 | 6/2003 | Helms et al. | |
| 2004/0264093 A1 | 12/2004 | Boerstler et al. | |

(Continued)

*Primary Examiner* — Suresh Suryawanshi
(74) *Attorney, Agent, or Firm* — Meyertons, Hood, Kivlin, Kowert & Goetzel, P.C.

(57) ABSTRACT

Techniques are disclosed relating to power management of an integrated circuit. In one embodiment, an integrated circuit includes a plurality of temperature sensors configured to measure a plurality of temperatures at different locations in the integrated circuit. The integrated circuit further includes a power management circuit configured to determine a set of guard bands based on a temperature difference determined using the plurality of temperatures. The power management circuit is configured to adjust, using the set of guard bands, a particular one of the plurality of temperatures, and to use the adjusted particular temperature to manage power consumption of the integrated circuit. In some embodiments, the power management circuit is configured to manage the power consumption by adjusting a voltage supplied to the integrated circuit, the adjusted voltage being based on the adjusted particular temperature.

19 Claims, 7 Drawing Sheets

(56) References Cited

U.S. PATENT DOCUMENTS

| | | | |
|---|---|---|---|
| 2005/0004717 A1* | 1/2005 | Fukushima | G05D 23/1931 700/299 |
| 2005/0188230 A1 | 8/2005 | Bilak | |
| 2006/0265174 A1 | 11/2006 | Doyle et al. | |
| 2006/0267127 A1* | 11/2006 | Kim | G05F 3/30 257/467 |
| 2008/0186002 A1* | 8/2008 | Singh | G06F 1/26 323/234 |
| 2009/0182986 A1 | 7/2009 | Schwinn et al. | |
| 2009/0322409 A1 | 12/2009 | Levit et al. | |
| 2010/0109757 A1 | 5/2010 | Wiatr et al. | |
| 2010/0213919 A1* | 8/2010 | Takayanagi | G06F 1/206 323/318 |
| 2012/0096288 A1 | 4/2012 | Bates et al. | |
| 2012/0119777 A1 | 5/2012 | von Kaenel | |
| 2012/0249219 A1 | 10/2012 | Shoemaker | |
| 2013/0076381 A1* | 3/2013 | Takayanagi | G01K 3/005 324/750.03 |

* cited by examiner

SYSTEMS AND METHODS FOR DETERMINING TEMPERATURES OF INTEGRATED CIRCUITS

BACKGROUND

Technical Field

This disclosure relates generally to integrated circuits, and, more specifically, to integrated circuit power management within an integrated circuit.

Description of the Related Art

Management of power consumption and thermal output is important in integrated circuit design as circuits are designed to operate within particular temperature ranges. To ensure operation within this range, an integrated circuit may include multiple temperature sensors located throughout a die to monitor internal temperatures. Temperatures measured by these sensors may be used to select appropriate operating voltages and/or operating frequencies. For example, a processor experiencing high demand may select to use a higher operating frequency and higher voltage. As the processor nears its thermal limits and risks overheating, the processor may instruct a cooling system to take appropriate actions (e.g. increase processor fan speeds), and may decrease its operating frequency and/or operating voltage.

In addition, an integrated circuit's operating speed or operating voltage has dependency on die temperature, hence the die temperature information can be used to optimize the frequency or and voltage to optimize the performance and power.

SUMMARY

The present disclosure describes embodiments in which power management of an integrated circuit is controlled based on measured temperatures of the integrated circuit. In some embodiments, guard bands are applied to measured temperatures of an integrated circuit to account for variations in measured temperatures from actual temperatures across the integrated circuit. (In another embodiment, a guard band is applied to a selected operating voltage discussed below.) In various embodiments, the sizes of the guard bands are dynamically changed based on a determined temperature variation (i.e., temperature delta) associated with the circuit. For example, a larger guard band may be applied when the circuit is experiencing a higher temperature delta, and a smaller guard band may be applied when the circuit is experiencing a lower temperature delta.

In some embodiments, temperatures that are adjusted based on guard bands are used to select a voltage supplied to the integrated circuit. In such an embodiment, the voltage selected is a minimum one that would allow the circuit to function correctly within the range of adjusted temperatures. In some embodiments, the adjusted temperatures may also be used to select an appropriate operating frequency for the integrated circuit.

Figure 1:
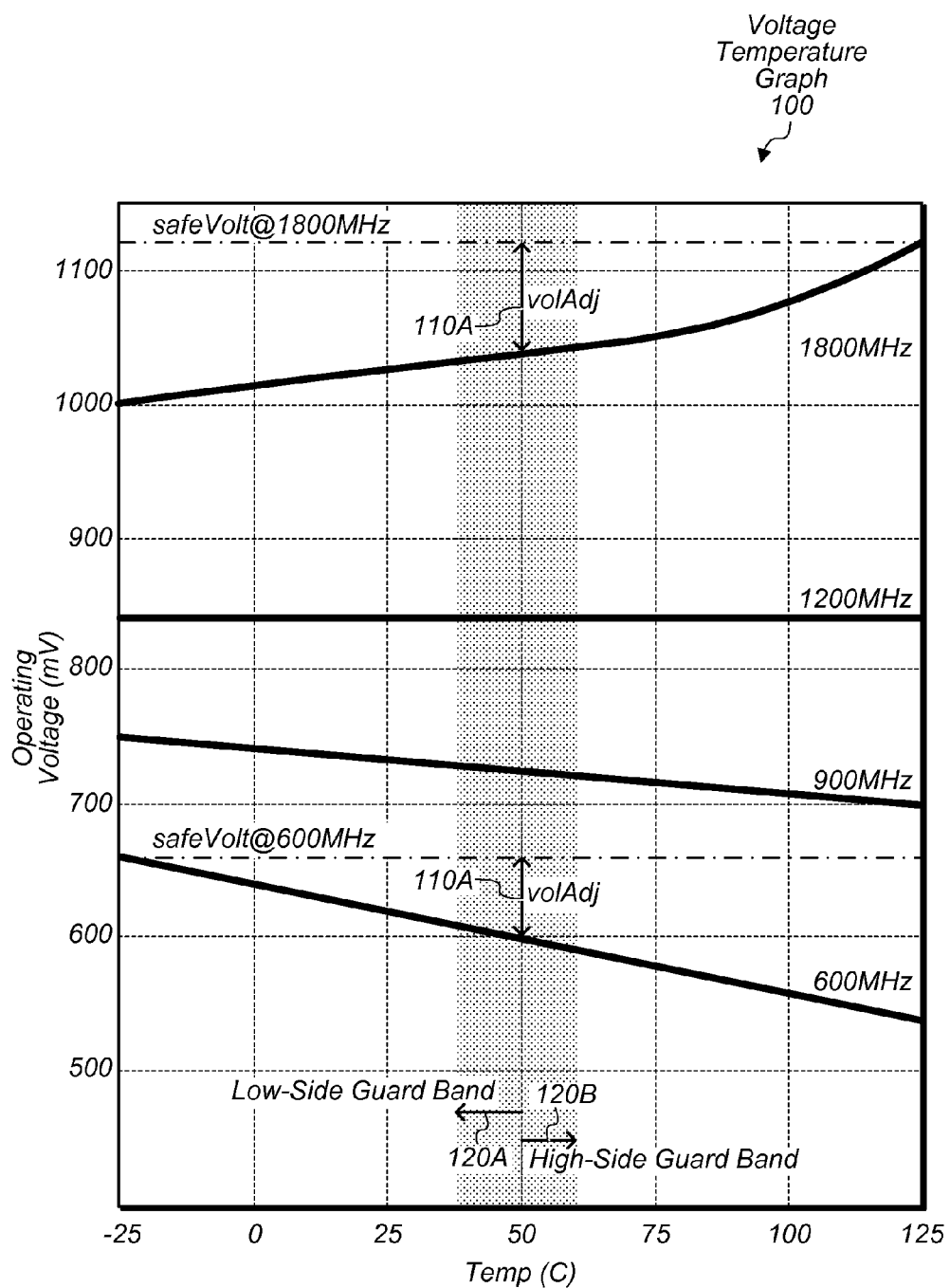
FIG. 1 is a graph illustrating one embodiment of a voltage temperature relationship.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "temperature circuit configured to measure an internal operating temperature of a processing element" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

An integrated circuit typically needs to receive a minimum amount of operating voltage in order to function correctly. This amount may be dependent on several factors, including the temperature and operating frequency of the integrated circuit.

Turning now to FIG. 1, a graph 100 of showing an exemplary relationship between operating temperature, frequency, and voltage is depicted. In this example, an integrated circuit may be configured to operate within a temperature range of −25° C. to 125° C. and operate at one of four operating frequencies: 1800 MHz, 1200 MHz, 900 MHz, and 600 MHz. Depending upon the particular temperature and frequency, graph 100 indicates a particular voltage needed to ensure correct operation of the integrated circuit. For example, if the integrated circuit operates at 600 MHz and at 50° C., a minimum of 600 mV needs to be supplied to the integrated circuit. The ranges shown in FIG. 1 are shown for example and may not necessarily be the actual operating ranges of an integrated circuit.

In order to ensure that an integrated circuit operates correctly throughout its entire thermal range, a "safe voltage" may be selected. That is, voltage may be selected that is high enough in order to ensure that the circuit functions correctly throughout its operating temperature range. For example, as shown, safe voltages of 1125 mV and 650 mV may be selected when operating at 1800 MHz and 600 MHz, respectively. Maintaining an integrated circuit at its safe voltage, however, can consume a considerable amount of power because power consumption is proportional to the square of the operating voltage. For this reason, an integrated circuit's voltage may be dynamically adjusted based on the current temperature and operating frequency in order to conserve power. For example, as shown by voltage adjustments 110A and 110B, the voltage supplied to the integrated circuit may be lowered by 75 mV when operating at 1800 Mhz and 50 mV when operating at 600 MHz.

Because different portions of an integrated circuit may have different temperatures at a given point in time, a "guard band" adjustment may be applied to the measured temperatures in order to ensure that a sufficient voltage is maintained for this variance. As used herein, the term "guard band" refers to 1) a temperature offset that is used to adjust a measured temperature to ensure that a sufficient voltage is maintained or 2) a voltage offset that is used to adjust a selected voltage to be supplied to an integrated circuit in order to ensure that the selected voltage is sufficient. Guard bands may also be applied to account for inaccuracies of temperature sensors as well as the inability to place temperature sensors at ideal locations. As shown, a low-side guard band 120A may be subtracted from a measured temperature of 50° C. to account for temperatures in the circuit that are lower than the measured temperature. A high-side guard band 120B may also be added to the measured temperature to account for temperatures in the circuit that are higher than the measured temperature. A sufficient voltage may then be selected for the temperatures falling within the range between the two adjusted temperatures. For example, when operating at 600 MHz, a voltage of 625 mV may be selected based on the temperature adjusted with guard band 120A. The concept of a guard band is generally discussed in, for example, U.S. Pat. No. 8,766,704 to Takayangi.

The amount of guard band needed at a given time may be dependent on the variation of temperature (i.e., the temperature delta) across an integrated circuit. That is, as the variation increases, larger guard bands may be warranted. It is undesirable, however, to use the largest possible guard band for all use cases as doing so would consume unnecessary power.

As will be described below, in various embodiments, an integrated circuit is configured to dynamically change the guard bands applied to measured temperatures based on the temperature delta across the integrated circuit. In doing so, the integrated circuit may be able to obtain lower power consumption than using static guard bands. In some embodiments, temperature sensors may be strategically placed throughout the integrated circuit and even externally to the integrated circuit. This arrangement allows the integrated circuit to accurately distinguish between two scenarios: 1) the integrated circuit is experiencing high temperatures due to existing ambient temperatures and 2) the integrated circuit is experiencing high temperatures due to the circuit being under load and hence high power dissipation, which can result in a high temperature delta. In the first scenario, smaller guard bands may be selected than for the second scenario because the integrated circuit is experiencing a lower temperature delta due to the higher temperatures being attributable to ambient heat as opposed to the circuit itself. For example, if the first scenario is applicable, a high-side guard band of 6° C. may be added to measured temperatures. In the second scenario, greater guard bands may be selected because the integrated circuit is experiencing a higher temperature delta due to the higher temperatures being largely attributable to heat generated by particular portions of the integrated circuit. For example, a high-side guard band of 14° C. may be added to measured temperatures.

Figure 2:
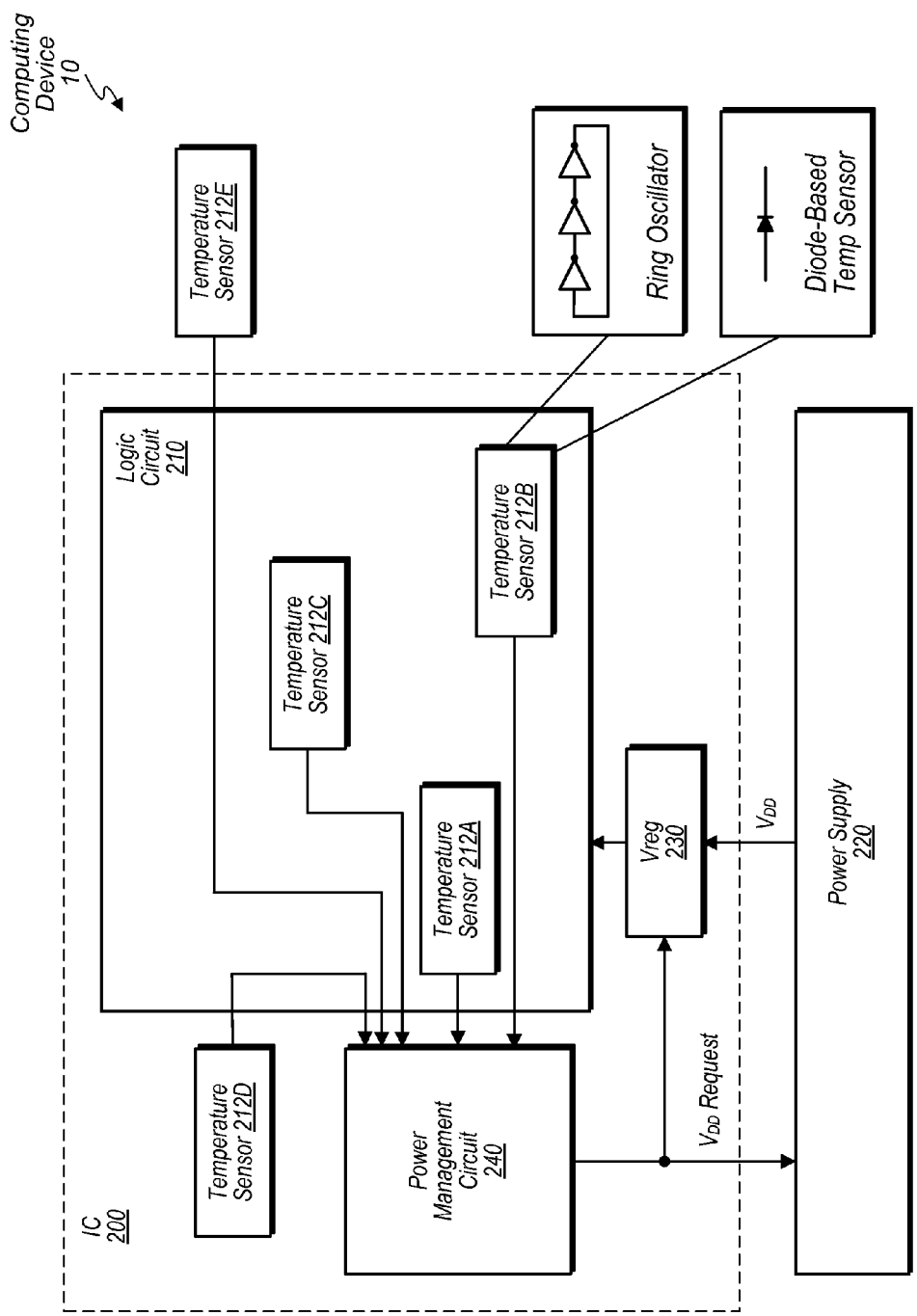
FIG. 2 is a block diagram illustrating one embodiment of a computing device that is configured to perform power management using dynamic guard bands.

Turning now to FIG. 2, a block diagram of one embodiment of a computing device 10 configured to dynamically change guard bands is depicted. In the illustrated embodiment, computing device 10 includes an integrated circuit (IC) 200 coupled to power supply 220. IC 200 may include a logic circuit 210, voltage regulator 230, and a power management circuit 240. Logic circuit 210 may include multiple temperature sensors 212A-212C. IC 200 may also include a temperature sensor 212D that is external to logic circuit 210. A temperature sensor 212E may also be located external to IC 200, but within computing device 10, for example being placed on the system board. In some embodiments, the number of temperature sensors 212 and location of sensors 212 may vary from that shown. Although not explicitly shown, logic circuit 210 may also include a number of different types of combinational and/or sequential logic circuits and functional units implemented therein to perform various functions of IC 200. Accordingly, in some embodiments, logic circuit 210 may correspond to a processor included within IC 200, which may implement a system on a chip (SoC) such as described below with respect to FIG. 5. Furthermore, although not explicitly shown, IC 200, in various embodiments, may include additional instances of logic circuit 210, which may (or may not) be in the same power domain as logic circuit 210.

Temperature sensors 212, in one embodiment, are configured to measure various temperatures of computing device 10. Sensors 212 may be implemented using any suitable type of temperature sensor. Accordingly, in some embodiments, temperature sensors 212 may be implemented as ring oscillator-based temperature sensors as shown. In another embodiment, temperature sensors 212 may be implemented as diode-based temperature sensors as shown. In various embodiments, sensors 212 are strategically placed in order to determine an accurate range of temperatures being experienced by IC 200 and computing device 10. Accordingly, sensors 212 may be placed in locations where circuitry typically produces high thermal outputs such as, in some embodiments, in cache circuitry, branch prediction circuitry in one or more processor cores within logic circuit 210, etc. Sensors 212 may also be placed in locations where circuitry typically produces low thermal outputs. Accordingly, in one embodiment, sensor 212D may be located in a non-volatile memory that is coupled to logic circuit 210. In one embodiment, sensor 212E may located on a housing of computing device 10. In various embodiments, locating sensors 212 in typically hot and cold areas may allow a more accurate temperature delta to be determined for IC 200. For example, if sensors 212A-212D measure high temperatures and sensor 212E also measures a high temperature, computing device 10 may be experiencing high ambient temperatures; however, the temperature delta across IC 200 may be relatively low. In contrast, if one or more sensors 212 are indicating high temperatures but sensor 212E is indicating a low temperature, IC 200 may be experiencing a relatively large temperature delta as device 10 may be in a cold environment and logic circuit 210 is responsible for the measured heat.

Power supply 220, in one embodiment, is a circuit that is configured to supply a power single $V_{DD}$ to IC 200. Accordingly, power supply 220 may be coupled to a power source (e.g., a battery, wall socket, etc.) and configured to adjust a voltage received from the power source to one suitable for IC 200. In the illustrated embodiment, voltage regulator (Vreg) 230 may also be used to further regulate voltages provided to various power domains in IC 200. In other embodiments, power may be supplied to IC 200 in a manner differently than shown—e.g., multiple or no regulators 230 may be used.

Power management circuit (PMC) 240, in one embodiment, is configured to manage the power consumption of IC 200 and logic circuit 210. Accordingly, in various embodiments, PMC 240 may manage power consumption by adjusting the operating voltage and/or operating frequency for logic circuit 210 based on various parameters such as the current operating frequency, the current operating voltage being supplied by power supply 220, and temperatures being measured by temperature sensors 212. For example, as discussed above with respect to FIG. 1, PMC 240 may determine that logic circuit 210 is operating at 1800 MHz and that the average temperature in circuit 210 is rising. In such an embodiment, PMC 240 may therefore send a $V_{DD}$ request to power supply 220 and/or Vreg 230 to raise the operating voltage supplied to logic circuit 210. As another example, PMC 240 may detect that circuit 210 is nearing its thermal operating limits and determine to throttle circuit 210 by lowering its operating voltage and operating frequency until it has cooled.

In some embodiments, PMC 240 is configured to apply temperature guard bands to measured temperatures to account for potential variations in temperature from the measured temperatures (e.g., due to a sensor 212 being located near a hot spot, but not actually at the hot spot). (In other embodiments, as noted above, PMC 240 may alternatively apply a voltage guard band to a voltage selected based on measured temperatures to account for variation.) As noted above, in some embodiments, these guard bands may include a high-side guard band and a low-side guard band. As also noted above, in various embodiments, PMC 240 is configured to dynamically change the applied guard bands based on a temperature delta across IC 200 and/or computing device 10. In such an embodiment, PMC 240 may select larger guard bands for large detected temperature deltas and smaller guard bands for smaller detected temperature deltas. In some instances, using smaller guard bands when larger ones are not warranted may allow PMC 240 to select a lower operating voltage for logical circuit 210, and thus conserve power.

Figure 3A:
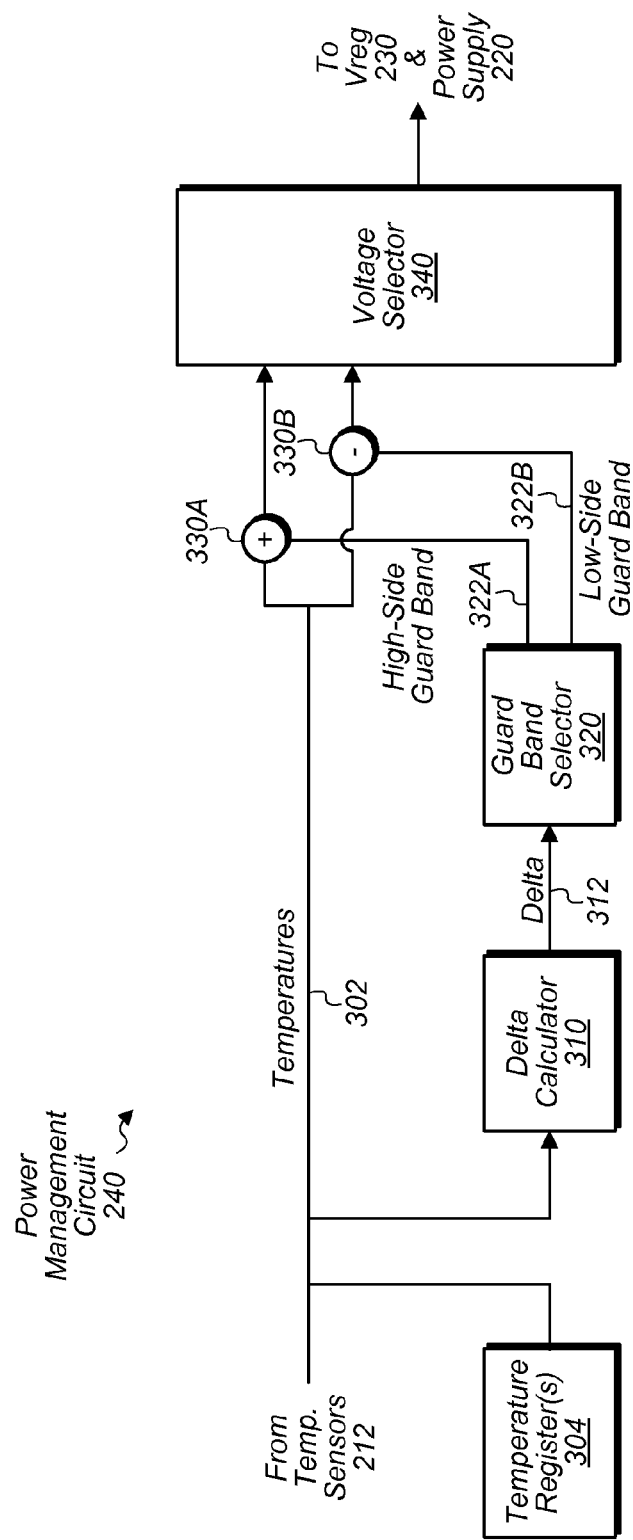
FIGS. 3A-C are block diagrams illustrating embodiments of the power management circuit.

Turning now to FIG. 3, a block diagram of one embodiment of power management circuit (PMC) 240 is depicted. In the illustrated embodiment, PMC 240 includes one or more temperature registers 304, temperature delta calculator 310, guard band selector 320, adder 330A, subtractor 330B, and voltage selector 340. In other embodiments, PMC 240 may be configured differently than shown. For example, in one embodiment, PMC 240 may not use elements 330 and may instead include an adder coupled to the output of voltage selected 340 to adjust the selected voltage based on a guard band from selector 320. In another embodiment, PMC 240 may not include registers 304.

Registers 304, in one embodiment, are configured to store measured temperatures 302 for sensors 212 that are not coupled to PMC 240. Accordingly, in some embodiments, PMC 240 is coupled to some, but not all of temperature sensors 212 and thus is able to receive temperatures 302 directly from some, but not all sensors. For example, in one embodiment, PMC 240 is not coupled to sensor 212E, and thus cannot receive temperature information directly from sensor 212E. In such an embodiment, software executing on logic circuit 210 may retrieve temperature information from sensor 212E and write the information to registers 304 so that this information is accessible to PMC 240. In one embodiment, this software is an operating system stored in a non-transient, yet tangible, computer-readable medium that is executing on circuit 210.

Delta calculator 310, in one embodiment, is circuitry configured to calculate a temperature delta 312 for logic circuit 210 based on received temperatures 302. Delta calculator 310 may calculate a temperature delta 312 using any of various techniques, and in some embodiments, may calculate multiple deltas 312. In one embodiment, delta calculator 310 includes comparator circuitry configured to identify the highest and lowest temperatures 302, and a subtractor circuit configured to calculate the delta 312 across the range of temperatures 302. In another embodiment, calculator 310 is configured to identify the lowest measured temperature 302 and subtract that temperature from each temperature 302 that is not the lowest in order to determine a respective delta 312 for each of those temperatures 302. In yet another embodiment, delta calculator 310 is configured to compute an average for a set of higher temperatures (e.g., the three highest) and an average for a set of lower temperatures (e.g., the three lowest), and then calculate the delta of these averages. In still another embodiment, calculator 310 is configured to calculate an average for a set of higher temperatures and then subtract the lowest temperature from this average to compute a delta 312. Delta calculator 310 is thus configured to compute a temperature delta 312 of some sort based on input temperatures 302.

Guard band selector 320, in one embodiment, is circuitry configured to select the guard bands 322 to apply based on the computed delta 312. In the illustrated embodiment, selector 320 is configured to select both a high-side guard band 322A and a low-side guard band 322B. In various embodiments, guard bands 322A may have a different magnitude than guard bands 322B. For example, for a given delta 312, a high-side guard band 322A of 8° C. and a low-side guard band 322B of 6° C. may be selected. In some embodiments, the same guard bands 322A and 322B are selected for each temperature 302. In other embodiments, selector 320 selects respective guard bands 322A and 322B for each temperature 302. In such an embodiment, selector 320 may select the guard bands 322 based on a respective delta 312 calculated for each temperature 302. In some embodiments, selector 302 includes comparator circuits configured to compare delta 312 with a set of predetermined threshold values, and based on these comparisons, select corresponding guard bands 322 stored in a table (not pictured). In another embodiment, selector 302 includes a content addressable memory (CAM) configured to output guard bands 322 based on a given received delta 312. In other embodiments, selector 302 includes logic configured to compute guard bands 322 from a formula based on a received delta 312.

Adder 330A, in one embodiment, is circuitry configured to add a high-side guard band 322A to a temperature 302. Accordingly, adder 330A may include a set of exclusive-OR (XOR) gates and a set of AND gates used to perform the addition. In some embodiments, PMC 240 includes multiple instances of adders 330A in order to perform multiple addition operations in parallel.

Subtractor 330B, in one embodiment, is circuitry configured to add a low-side guard band 322B to a temperature 302. In some embodiments, subtractor 330B is implemented in a similar manner as adder 330A, but uses a set of inventors. In general, logic circuits configured to perform addition or subtraction of numerical values are known, and any of these can be used to implement adder/subtractor 330. In some embodiments, multiple instances of subtractor 330B are used.

Voltage selector 340, in one embodiment, is circuitry configured to change the operating voltage of logic circuit 210 based on adjusted temperatures 302 received from adder 330A and subtractor 330B. In various embodiments, selector 340 is configured to select the lowest operating voltage that still permits circuit 210 to operate correctly. Like guard-band selector 320, voltage selector 340 may use any of various techniques to select an appropriate voltage. For example, in one embodiment, voltage selector 340 identifies the highest temperature 302 output by adder 330A and the lowest temperature 302 output by subtractor 330B and selects an appropriate voltage that allows for correct operation of logic circuit 210 at those temperatures. In another embodiment, voltage selector 340 may compute an average of temperatures 302 output by adder 330A and an average of temperatures 302 output by subtractor 330B, and then select an appropriate voltage. In some embodiment, selector 340 compares temperatures 302 from elements 330 with a set of predetermined threshold values to select an appropriate voltage. In another embodiment, selector 340 includes logic configured to apply a formula on temperatures 302 from elements 330 to compute a voltage. Although not depicted, voltage selector 340 may also select operating frequencies based on temperatures 302 and may determine, based on temperatures 302, to perform processor throttling to avoid overheating.

Figure 3B:
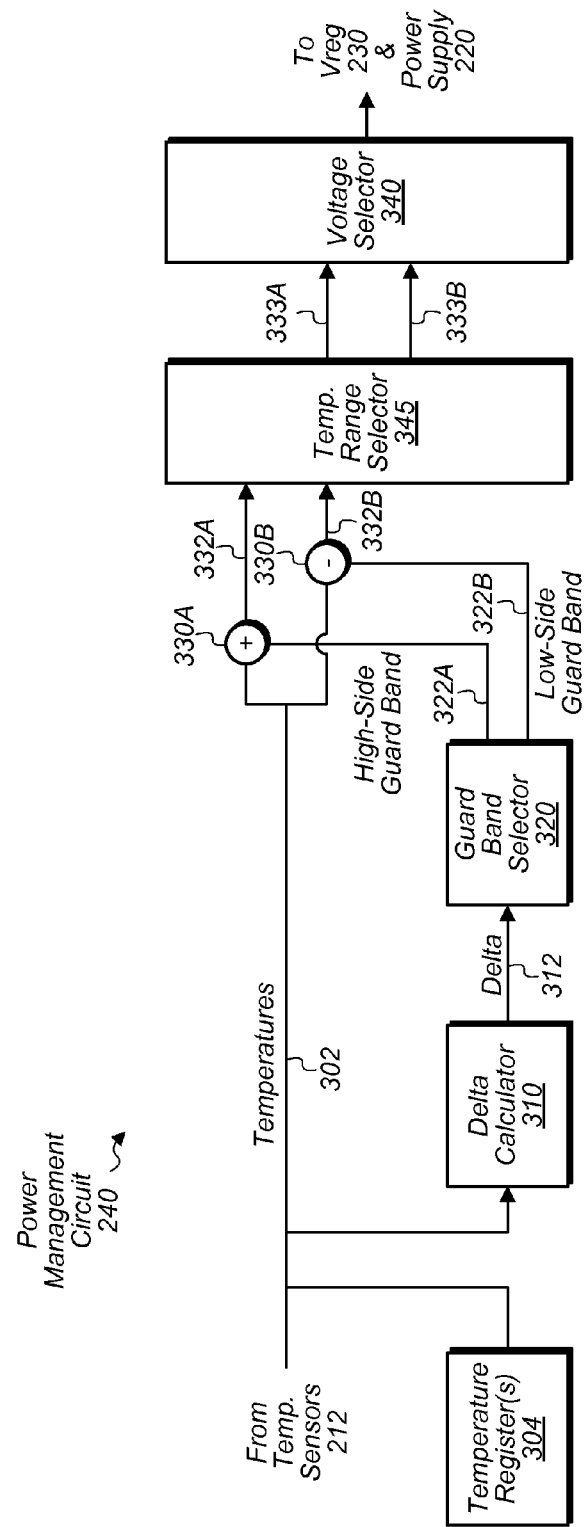
Figure 3C:
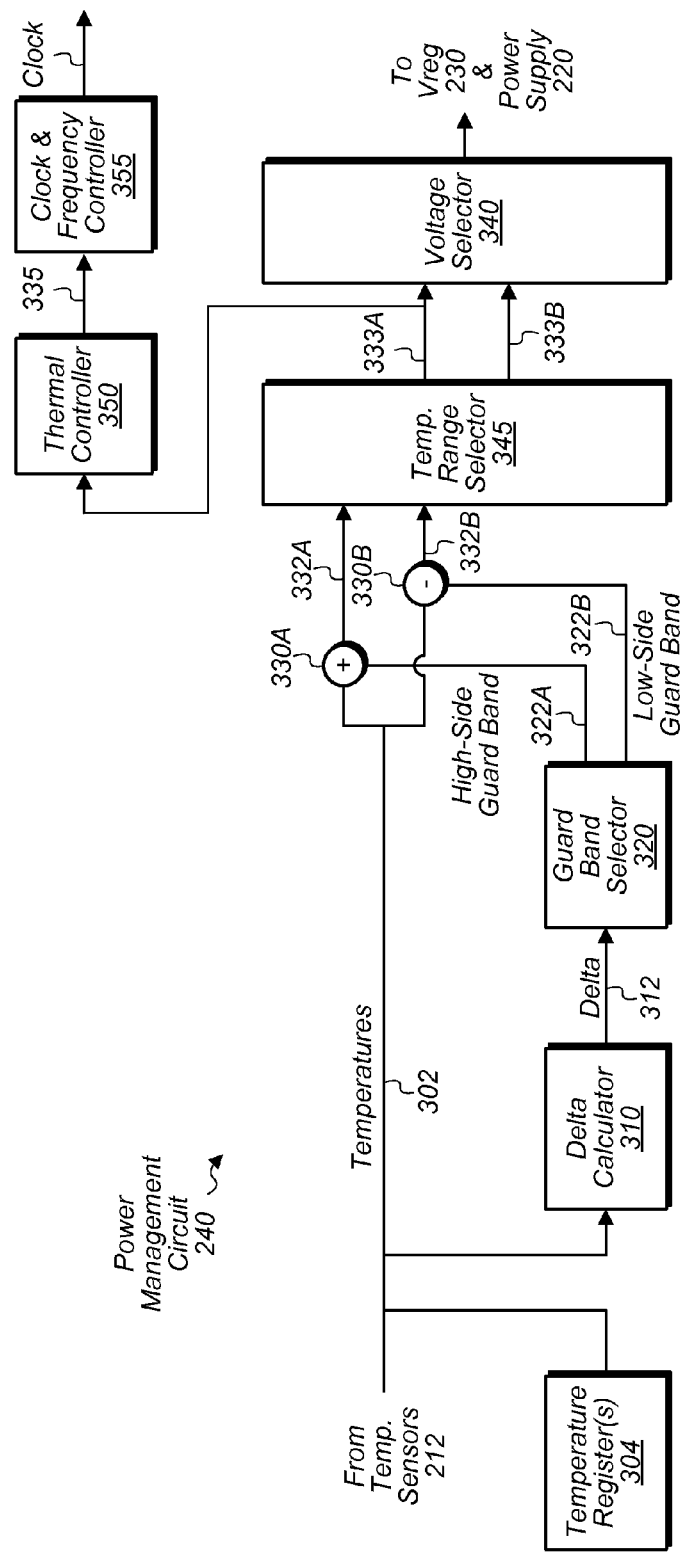

In some embodiment, a temperature range selector 345 may be inserted, as is shown in FIG. 3B. In such embodiment, temperature range selector 345 is logic configured to calculate an overall optimum high-side temperature 333A and an overall optimum low-side temperature 333B, by aggregating all the available temperatures 332A and 332B from multiple temperature sensors. This logic may be configured such that temperature 333A is the minimum of temperatures 332A after sufficient guard bands are added to each temperature 332A, and temperature 333B is the maximum of temperatures 332B after sufficient guardband is added to each of temperature 332A. Temperature range selector 345 may also include logic to cap the minimum temperature 333B at an ambient temperature (e.g., measured by sensor 212E), as the die temperature cannot be lower than the ambient temperature in most instances.

In some embodiments, the temperature range selector logic 345 may include logic to exclude invalid temperature sensor information, which may be indicated by a sensor 212's valid flag. This can happen as the voltage domain, which includes the temperature sensor, can be in sleep state and hence the temperature sensor may be put in sleep state.

In other embodiments, guard-banded high-side temperature information may be sent to a thermal controller 350 that detects the overheating situation and directs the clock & frequency control circuit 241 to throttle down the frequency to prevent the IC and the system from overheating.

Figure 4:
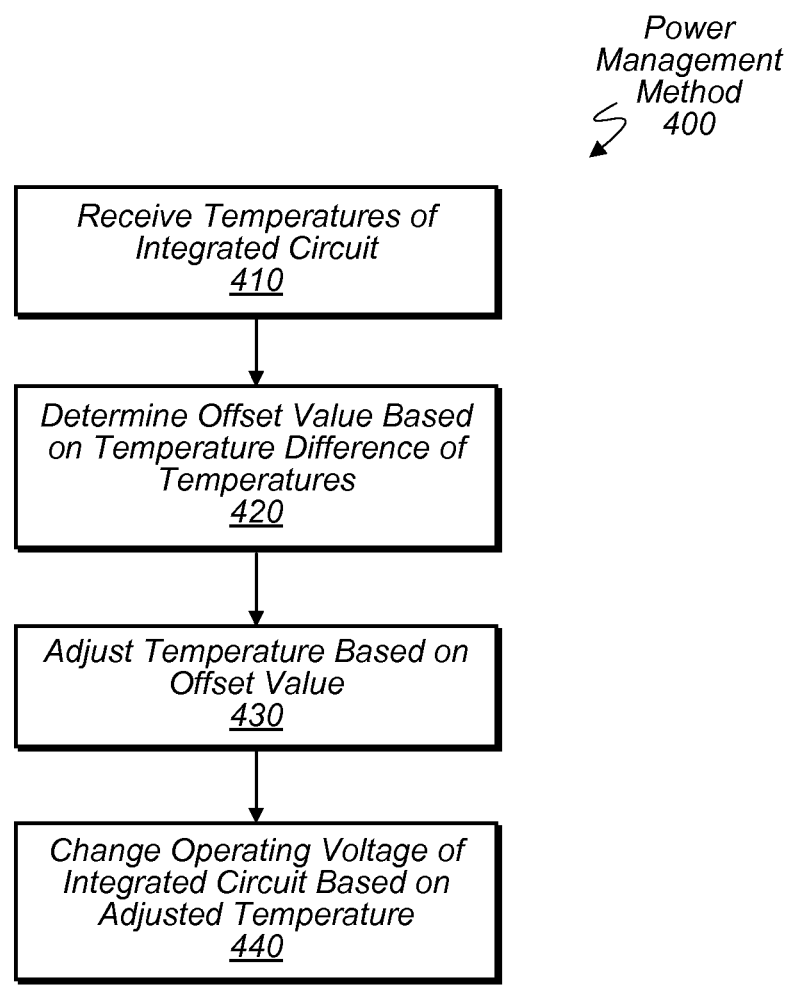
FIG. 4 is a flow diagram illustrating one embodiment of a method for power management.

Turning now to FIG. 4, a flow diagram of a method 400 for managing power consumption is depicted. Method 400 is one embodiment of a method that may be performed by an integrated circuit such as IC 200 via power management unit 240. In some instances, performance of method 400 may result in considerable reduction of power consumption.

In step 410, a plurality of temperatures (e.g., temperatures 302) of an integrated circuit is received. In some embodiments, the plurality of temperatures includes a first temperature measured by a temperature sensor located in the integrated circuit (e.g., temperature sensor 212A) and a second temperature measured by a temperature sensor located externally to the integrated circuit (e.g., temperature sensor 212E). In such an embodiment, this external sensor may be located in a housing of a computing device that includes the integrated circuit.

In step 420, an offset value (e.g., a guard band 322) is determined for one of the plurality of temperatures based on a temperature difference between the temperature and a minimum one of the plurality of temperatures. (In other embodiments of method 400, the temperature difference may be computed differently such as described above.) In some embodiments, step 420 includes determining the offset for a maximum one of the plurality of temperatures. In some embodiments, step 420 includes determining high-side and low-side offsets (e.g., guard bands 330A and 330B), which have different values. In some embodiments, step 420 may include determining offsets for each of the plurality of temperatures (or a subset).

In step 430, the temperature is adjusted based on the offset value determined in step 420. In some embodiments, step 430 includes adding the offset value to the temperature as a high-side guard band (e.g., at adder 330A). In some embodiments, step 430 further includes adjusting the temperature by subtracting another offset from the temperature as a low-side guard band (e.g., at subtractor 330B). In some embodiments, step 430 may include adjusting multiple ones of the plurality of temperatures.

In step 440, an operating voltage of the integrated circuit is changed based on the adjusted temperature. In some embodiments, step 440 may be based multiple adjusted temperatures using various techniques discussed above. In various embodiments, step 440 may also include selecting a lowest operating voltage that still permits the integrated circuit to operate properly. In some embodiments, step 440 may be performed in conjunction with throttling a processor.

Exemplary Computer System

Figure 5:
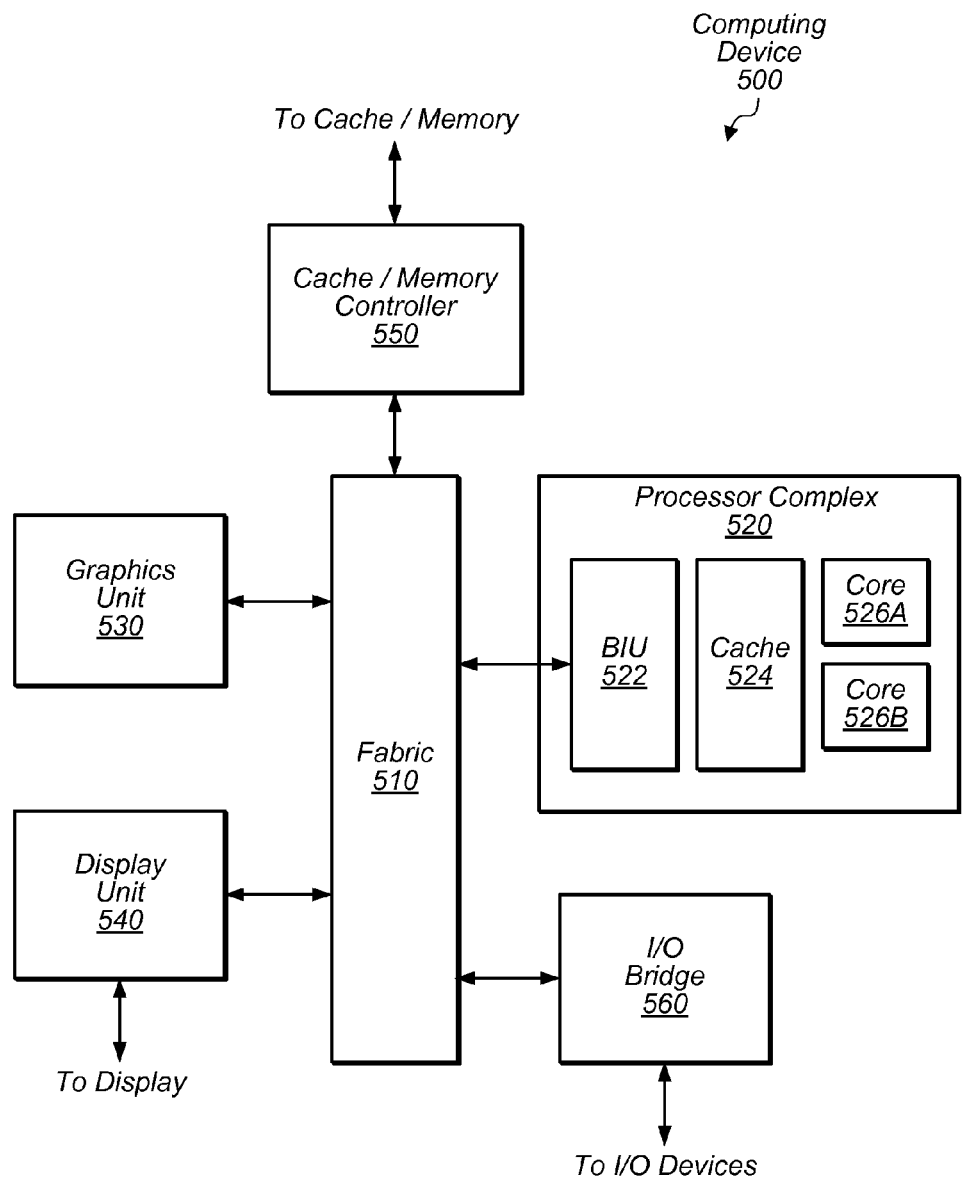
FIG. 5 is a block diagram illustrating one embodiment of an exemplary computer system.

Turning now to FIG. 5, a block diagram illustrating an exemplary embodiment of a device 500 is shown. In some embodiments, device 500 may be implement functionality described above with respect to computing device 10 (or similarly computing device 10 may include circuitry from device 500.) In some embodiments, elements of device 500 may be included within a system on a chip (SOC). In some embodiments, device 500 may be included in a mobile device, which may be battery-powered. Therefore, power consumption by device 500 may be an important design consideration. In the illustrated embodiment, device 500 includes fabric 510, processor complex 520, graphics unit 530, display unit 540, cache/memory controller 550, input/output (I/O) bridge 560.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA) which may include operating system instructions and user application instructions.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display.

Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc.

I/O bridge 560 may include various elements configured to implement: universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

\* \* \*

Although specific embodiments have been described above, these embodiments are not intended to limit the scope of the present disclosure, even where only a single embodiment is described with respect to a particular feature. For example, FIG. 3, FIG. 3B and FIG. 3C were explained as hardware-based implementations, but, in other embodiments, these may be entirely implemented in software algorithm. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
a plurality of temperature sensors configured to measure a plurality of temperatures at different locations in the integrated circuit;
a power management circuit configured to:
store a set of guard bands usable to adjust ones of the plurality of temperatures;
determine, using the plurality of temperatures, a temperature difference by subtracting a first temperature from a second temperature;
select ones of the stored set of guard bands based on the temperature difference;
adjust, using the selected guard bands, a particular one of the plurality of temperatures, wherein adjusting the particular temperature includes adding a guard band to the particular temperature; and
manage power consumption of the integrated circuit using the adjusted particular temperature.

2. The integrated circuit of claim 1, wherein the power management circuit is configured to manage the power consumption by adjusting a voltage supplied to the integrated circuit, wherein the adjusted voltage is based on the adjusted particular temperature.

3. The integrated circuit of claim 1, wherein the power management circuit is configured to manage the power consumption by adjusting an operating frequency of the integrated circuit, wherein the adjusted operating frequency is based on the adjusted particular temperature.

4. The integrated circuit of claim 1, wherein the power management circuit is configured to:
select a first of the set of guard bands based on a first temperature difference computed using the plurality of temperatures; and
select a second of the set of guard bands based on a second temperature difference computed using the plurality of temperatures, wherein the power management circuit is configured to select the first and second guard bands such that the second guard band is larger than the first guard band in response to the second temperature difference being greater than the first temperature difference.

5. The integrated circuit of claim 1, further comprising:
a processor configured to execute instructions, wherein a first of the plurality of temperature sensors is located within the processor, and wherein a second of the plurality of temperature sensors is located externally to the processor.

6. The integrated circuit of claim 1, wherein the set of guard bands includes a first guard band and a second guard band, and wherein the power management circuit is configured to:
calculate a first adjusted temperature by adding the first guard band to the particular temperature;
calculate a second adjusted temperature by subtracting the second guard band from the particular temperature; and
manage the power consumption of the integrated circuit based on the first and second adjusted temperatures.

7. The integrated circuit of claim 1, wherein the particular temperature is a temperature measured by a first of the plurality of temperature sensors, and wherein the power management circuit is configured to:
select another set of guard bands for a temperature measured by a second of the plurality of temperature sensors; and
adjust, using the other set of guard bands, the temperature measured by the second temperature sensor.

8. The integrated circuit of claim 1, wherein the power management circuit is configured to:
receive an external temperature from a temperature sensor located externally to the integrated circuit;
determine a minimum one of the plurality of temperatures and the received external temperature; and
select ones of the set of the guard bands using a temperature difference computed using the minimum temperature.

9. The integrated circuit of claim 8, wherein the power management circuit includes a register configured to receive the external temperature from the external temperature sensor, wherein the register is accessible to an operating system executable to store the external temperature from the external temperature sensor in the register.

10. A computing device, comprising:
a processor;
a plurality of temperature sensors configured to measure a plurality of temperatures of the computing device including temperatures of the processor; and
a power management unit configured to:
store a set of guard bands usable to adjust ones of the plurality of temperatures;
select a first of the set of guard bands based on a temperature difference computed using the plurality of temperatures;
perform a first adjustment of a first of the plurality of temperatures by adding the first guard band to the first temperature; and
change, based on the first adjustment of the first temperature, a voltage supplied to the processor.

11. The computing device of claim 10, wherein the power management unit is configured to:
select a second of the set of guard bands based on the temperature difference;
perform a second adjustment of the first temperature by subtracting the second guard band from the first temperature; and
change the voltage based on the second adjustment.

12. The computing device of claim 10, wherein the plurality of temperature sensors includes a temperature sensor located on a housing of the computing device.

13. The computing device of claim 10, wherein the power management unit is configured to:
identify a minimum one of the plurality of temperatures; and
determine the temperature difference based on the minimum identified temperature.

14. The computing device of claim 13, wherein the power management unit is configured to:
identify a maximum one of the plurality of temperatures; and
determine the temperature difference between the minimum identified temperature and the maximum temperature.

15. The computing device of claim 10, wherein the power management unit is configured to change the voltage to throttle the processor.

16. A method, comprising:
- storing, in an integrated circuit, a set of offset values usable to adjust temperatures;
- receiving a plurality of temperatures of the integrated circuit;
- dynamically determining, for a particular one of the plurality of temperatures, an offset value based on the stored set of offset values and a temperature difference between the particular temperature and a minimum one of the plurality of temperatures;
- adjusting the particular temperature based on the offset value; and
- changing an operating voltage of the integrated circuit based on the adjusted particular temperature.

17. The method of claim 16, wherein the particular temperature is a maximum one of the plurality of temperatures.

18. The method of claim 16, wherein the plurality of temperatures includes a first temperature measured by a temperature sensor located in the integrated circuit and a second temperature measured by a temperature sensor located externally to the integrated circuit.

19. The method of claim 16, wherein the offset value is a high-side guard band that is added to the particular temperature to adjust the particular temperature, and wherein the method further comprises:
- dynamically determining, for the particular temperature, a low-side guard band based on the temperature difference; and
- adjusting the particular temperature by subtracting the low-side guard band from the particular temperature.

* * * * *